(12) United States Patent
Takahoshi et al.

(10) Patent No.: US 6,556,428 B1
(45) Date of Patent: *Apr. 29, 2003

(54) GAS INSULATED SWITCHGEAR

(75) Inventors: Masahiro Takahoshi, Hitachi (JP); Keiichi Tsuzura, Hitachi (JP); Ryoichi Shinohara, Hitachi (JP); Rei Henmi, Hitachi (JP); Yoriyuki Aiko, Hitachi (JP); Shunji Ito, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/272,945

(22) Filed: Oct. 18, 2002

Related U.S. Application Data (63) Continuation of application No. 09/936,358, filed on Jan. 14, 2002.

(51) Int. Cl.⁷ .................................................. H02B 5/00
(52) U.S. Cl. ........................ 361/619; 361/604; 361/612; 361/618
(58) Field of Search .............................. 361/612, 604, 361/618, 619; 218/43, 45

(56) References Cited

U.S. PATENT DOCUMENTS

| | | | |
|---|---|---|---|
| 4,032,820 A | | 6/1977 | Oishi et al. |
| 4,638,403 A | * | 1/1987 | Amano et al. ............... 361/612 |
| 5,200,881 A | | 4/1993 | Itai |
| 5,373,415 A | * | 12/1994 | Tawaratani ................. 361/612 |
| 5,590,018 A | | 12/1996 | Watahiki et al. |
| 5,625,530 A | * | 4/1997 | Inami et al. ................. 361/604 |
| 5,754,382 A | | 5/1998 | Aoyama et al. |
| 5,757,614 A | | 5/1998 | Hachida et al. |
| 6,399,911 B1 | * | 6/2002 | Tsuzura et al. ............... 218/43 |
| 6,469,270 B1 | * | 10/2002 | Omori et al. ................... 218/7 |

FOREIGN PATENT DOCUMENTS

| | | | |
|---|---|---|---|
| EP | 1024569 A2 | * 8/2000 | ............ H02B/5/06 |
| JP | 48-42338 | 6/1973 | |
| JP | 54-106835 | 8/1979 | |
| JP | 54-109835 | 8/1979 | |
| JP | 57-211915 | 12/1982 | |
| JP | 58-75413 | 5/1983 | |
| JP | 59-6706 | 1/1984 | |
| JP | 01174205 A | 7/1989 | |
| JP | 2-254908 | 10/1990 | |
| JP | 03040702 A | 2/1991 | |
| JP | 3-245706 | 11/1991 | |
| JP | 4-88813 | 3/1992 | |
| JP | 04145814 A | 5/1992 | |
| JP | 5-33610 | 4/1993 | |
| JP | 6-6915 | 1/1994 | |
| JP | 7-298434 | 11/1995 | |
| JP | 9-261810 | 10/1997 | |
| JP | 10-108327 | 4/1998 | |

* cited by examiner

Primary Examiner—Boris Chervinsky
(74) Attorney, Agent, or Firm—Mattingly, Stanger & Malur, P.C.

(57) ABSTRACT

A gas insulated switchgear includes a plurality of T-branched circuit breaker units arranged in a direction perpendicular to the T-branch direction, and connected by first connection bus units and second connection bus units in series alternately in a rectangular wave shape on a horizontal plane of approximately the same height as the T-branch portions of the circuit breaker units. First connection buses and second connection buses are arranged around on the horizontal plane of the same height as the T-branch portions of the circuit breaker units, but are not arranged in an up and down direction.

3 Claims, 10 Drawing Sheets

GAS INSULATED SWITCHGEAR

This is a continuation application of U.S. Ser. No. 09/936,358, filed Jan. 14, 2002.

TECHNICAL FIELD

The present invention relates to a ring bus arrangement type gas insulated switchgear.

BACKGROUND OF THE ART

In a conventional ring bus arrangement type gas insulated switchgear, a plurality of circuit breaker units and a plurality of line side units are oppositely arranged and connection bus units are arranged between the circuit breaker units and the line side units, oppositely arranged, as disclosed in JP A 57-211915, JP A 59-6706, JP A 3-245706 or JU A 5-33610. However, in such a construction, the connection bus is very long because the connection bus is stretched around in horizontal and vertical directions.

Further, there are a ring bus arrangement type gas insulated switchgear in which a plurality of circuit breaker units and a plurality of line side units are alternately arranged in loop as a ring bus arrangement type gas insulated switchgear disclosed in JP A 58-75413 or JP A 9-261810, and a ring bus arrangement type gas insulated switchgear in which connection bus units each are formed in loop and a plurality of units each of which formed by connecting a circuit breaker unit and a line side unit are arranged along the connection bus units as a ring bus arrangement type gas insulated switchgear disclosed in JP A 48-42338, JP A 10-108327 or JP A 2-254908. However, in such a construction, an installation area increases according to increase in the number of circuit lines and it becomes necessary to disassemble and move each unit in the case where circuit lines are added.

Still further, there is a ring bus arrangement type gas insulated switchgear in which a plurality of circuit breakers each phase-separated and horizontally laid are arranged and axial ends of the plurality of circuit units are alternately connected in series for each phase by connecting bus units, as a ring bus arrangement type gas insulated switchgear disclosed in JP A 54-109835. However, in such a construction, the length of the circuit breaker units in an arrangement direction becomes long and an installation area increase because phases are separated. Further, on the contrary, when the circuit breaker is constructed so as to be laid horizontally in lump of three phases, branches from the circuit units become complicated and it is necessary to stretch around the connection buses in an up and down direction.

DISCLOSURE OF THE INVENTION

An object of the present invention is to provide a ring bus arrangement type gas insulated switchgear which is able to reduce its cost by shortening the length of a connection bus. In addition, another object of the present invention is to provide a ring bus arrangement type gas insulated switchgear which is able to reduce an installation area, to simplify addition of circuit lines, or to improve the workability of maintenance and inspection.

A basic feature of the present invention is to arrange a plurality of T-branched circuit breaker units in a direction perpendicular to their branch directions and connect adjacent circuit breaker units by connection bus units alternately left and right of the arrangement direction of the circuit breaker units on a horizontal plane of approximately the same height as the T-branch portions of the circuit breaker units, that is, to connect them in a rectangular wave shape. By such connection, the connection bus are stretched around on the horizontal plane of approximately the same height as the T-branch portions of the circuit breaker units and not stretched around in an up and down direction, whereby it is possible to reduce the length of the connection bus by an amount corresponding thereto. Therefore, it is possible to reduce the cost. Further, by arranging a return bus unit below the connection bus unit, it is possible to shorten the length of buses connecting the return bus unit and the connection buses, so that the cost can be reduced further.

Further, according to the connection as mentioned above, it is possible to easily carry out an extension by taking off a connection portion of the connection bus unit and the return bus unit, increasing a unit of one circuit line, that is, a unitary unit composed of a circuit breaker unit, current transformer unit, connection bus unit and line side unit, and a return bus unit, and connecting again the taken off connection portion of the connection bus unit and the return bus unit. Further, the taken off parts can be used again, so that a new unit product is not accompanied.

In the present invention, the connection bus unit, the current transformer units and the line side units are connected on the horizontal plane of approximately the same height as the T-branch portion of the circuit beaker units, so that a space below them can be effectively used. In the present invention, a control box is arranged in the space, so that an installation area can be reduced by an amount corresponding thereto. Further, a space reverse to the space in which the control box is disposed can be used as a space for maintenance inspection of an operation device of the circuit breaker, so that it is possible to easily effect the maintenance inspection.

In the present invention, current transformers are not incorporated in the circuit breaker unit 12, but they are provided separately as the current transformer units 13. By providing the current transformers separately in this manner, the current transformers can effect precise current detection without affection of current interruption arcs of the circuit breaker, and it is possible to improve the reliability. Further, by providing the current transformers separately, even if an accident occurs on the opposite-to-circuit-breaker side of the current transformer, a power supply failure region can be limited to only the corresponding accident circuit line without interruption of circuits of all the circuit lines. Therefore, it is possible to improve power supply service.

In the present invention, a circuit construction by a single connection line and a real apparatus construction are constructed the same as each other, that is, along skeletons of the units. By taking such a construction, even if an accident occurred, the accident portion can be easily found, so that it is possible to restore the portion of the accident soon. Therefore, the reliability can be increased. Further, in the case of maintenance inspection, since inspection portions can be easily found, it is possible to increase the workability of the maintenance inspection. Further, the circuit construction by a single connection line is applied on an operation panel of a monitoring room as a simulation bus, and operation switches of each apparatus are mounted on the simulation bus. If the circuit construction by a single connection line and the real apparatus construction are the same as each other, it is possible to prevent erroneous operation by operators.

BEST MODE OF EMBODIMENT OF THE INVENTION

Figure 15:
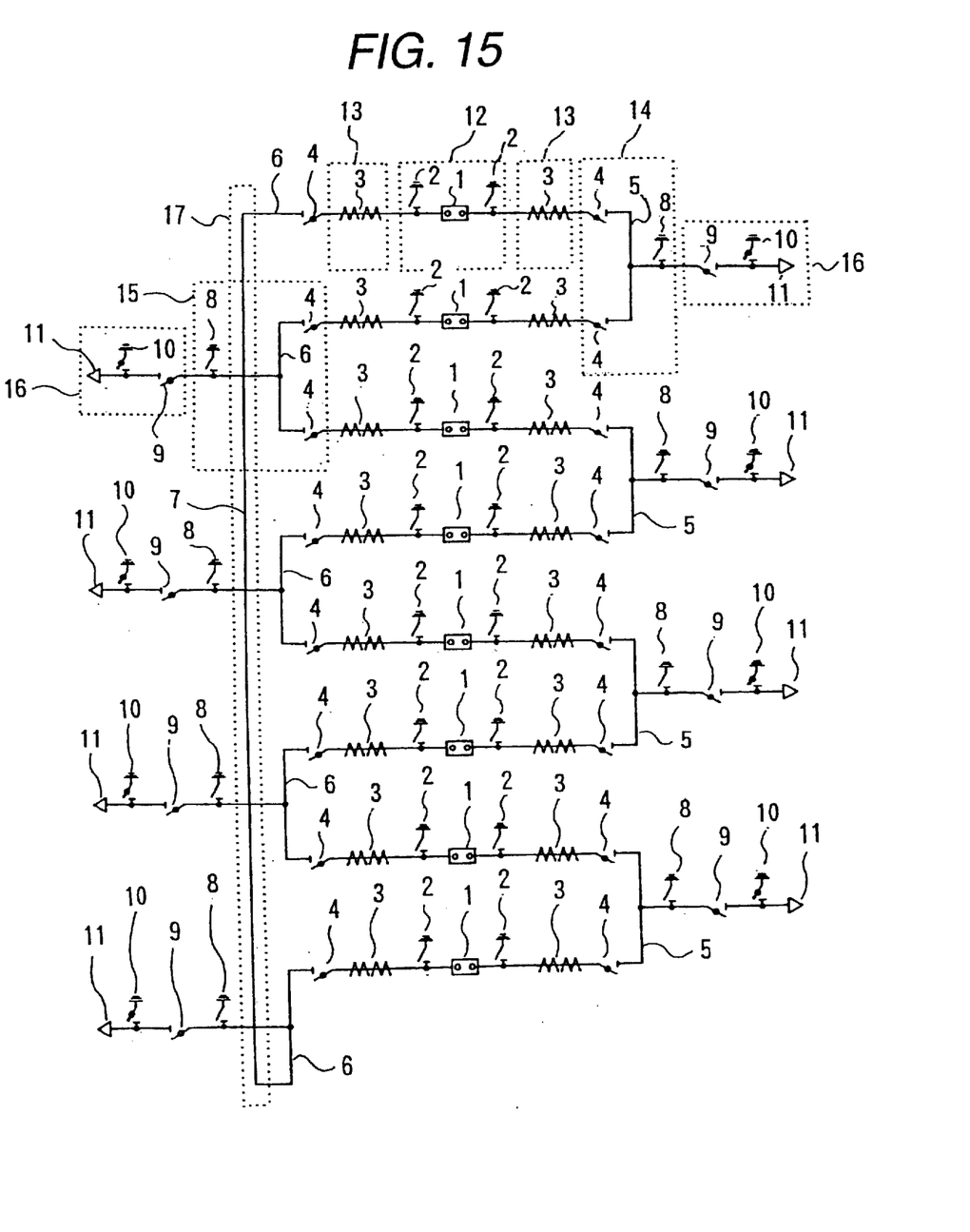
FIG. 15 is a single line connection diagram showing a circuit construction of a ring bus arrangement type gas insulated switchgear of an embodiment of the present invention.

FIG. 15 shows a circuit construction of a ring bus arrangement type gas insulated switchgear of an embodiment of the present invention.

1 denotes a circuit breaker, and earth devices 2 are arranged on both sides of the circuit breaker 1. Current transformers 3 are connected to the earth devices 2, respectively, on the sides opposite to the circuit breaker 1, and disconnecting switches 4 are connected to the current transformers 3, respectively, on the sides opposite to the earth devices 2. In the present embodiment, a plurality of series circuits, in each of which the circuit breaker 1, the earth devices 2, the current transformers 3 and the disconnecting switches 4 are electrically connected in series, are arranged perpendicularly to a direction of the connection thereof, that is, they are arranged in one row.

The plurality of series circuits are connected by first connection buses 5 and second connection buses 6. In the present embodiment, a plurality of the first connection buses 5 are arranged on one end side of each series circuit and a plurality of the second connection buses 6 are arranged on the other end sides, and the plurality of first connection buses 5 and the plurality of second connection buses 6 are used alternately to connect the plurality of series circuits in series in a direction of their arrangement. That is, the plurality of series circuits are connected in a rectangular wave shape so that a first series circuit and a second series circuit are connected by the first connection bus 5, then the second series circuit and a third series circuit are connected by the second connection bus 6, then the third series circuit and a fourth series circuit are connected by the first connection bus 5, and so on.

The series circuits, which are positioned at both ends in the arrangement direction of the series circuits, are connected in series by a return bus 7. A circuit, in which an earth device 8, disconnecting switch 9, earth device 10 and cable head 11 are connected in series, is connected to each of the first connection buses 5 and second connection buses 6.

Figure 1:
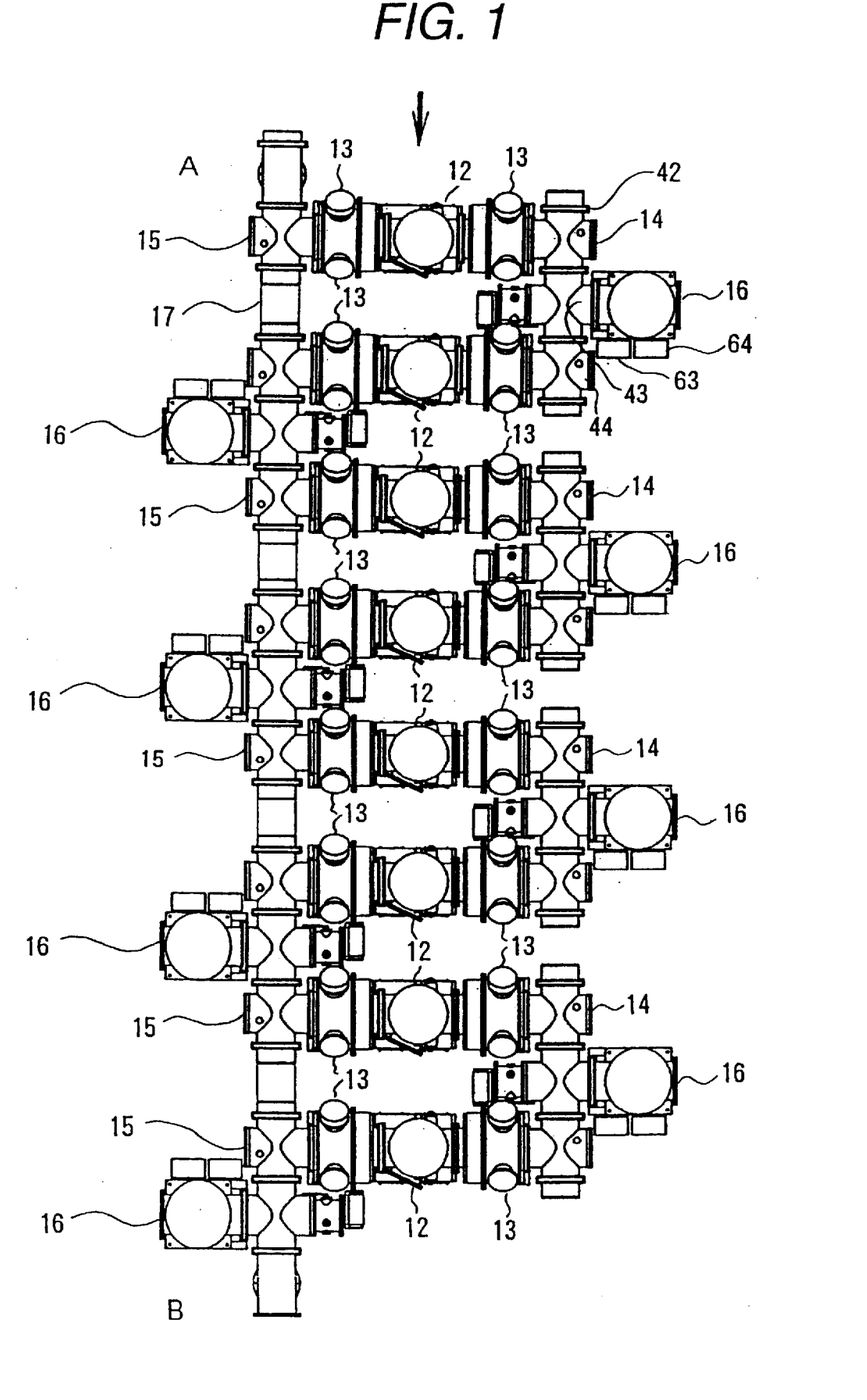
FIG. 1 is a plane view of an external structure of a ring bus arrangement type gas insulated switchgear of an embodiment of the present invention.
Figure 2:
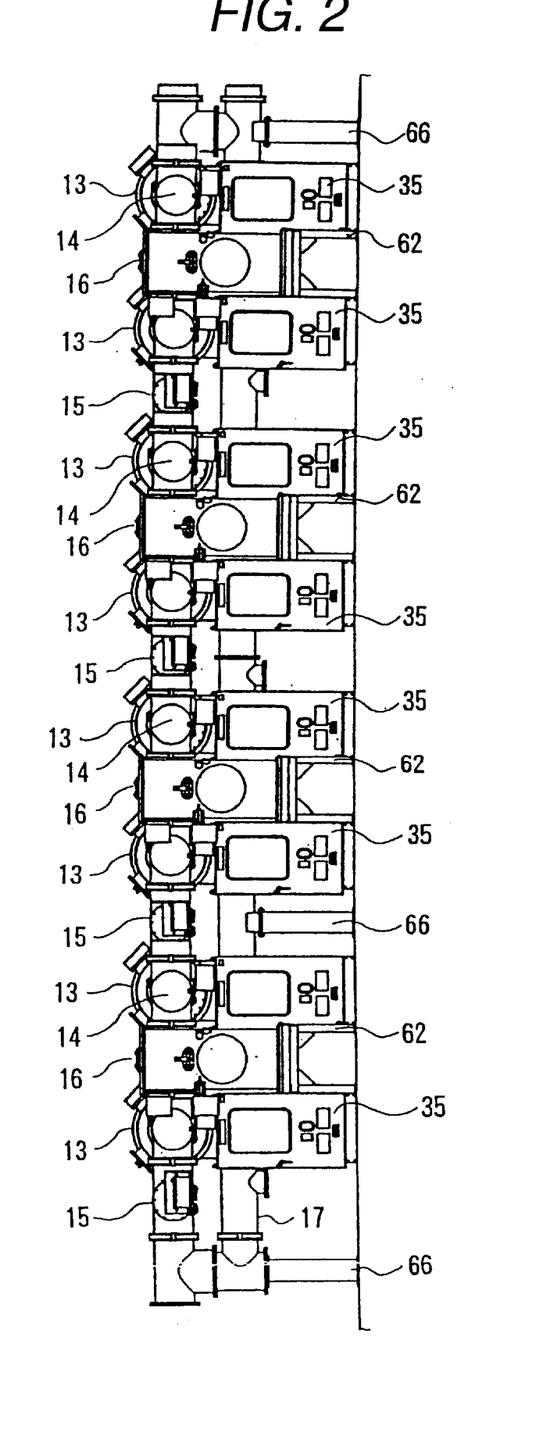
FIG. 2 is a plane view showing a construction of a II direction (a front) of FIG. 1.
Figure 3:
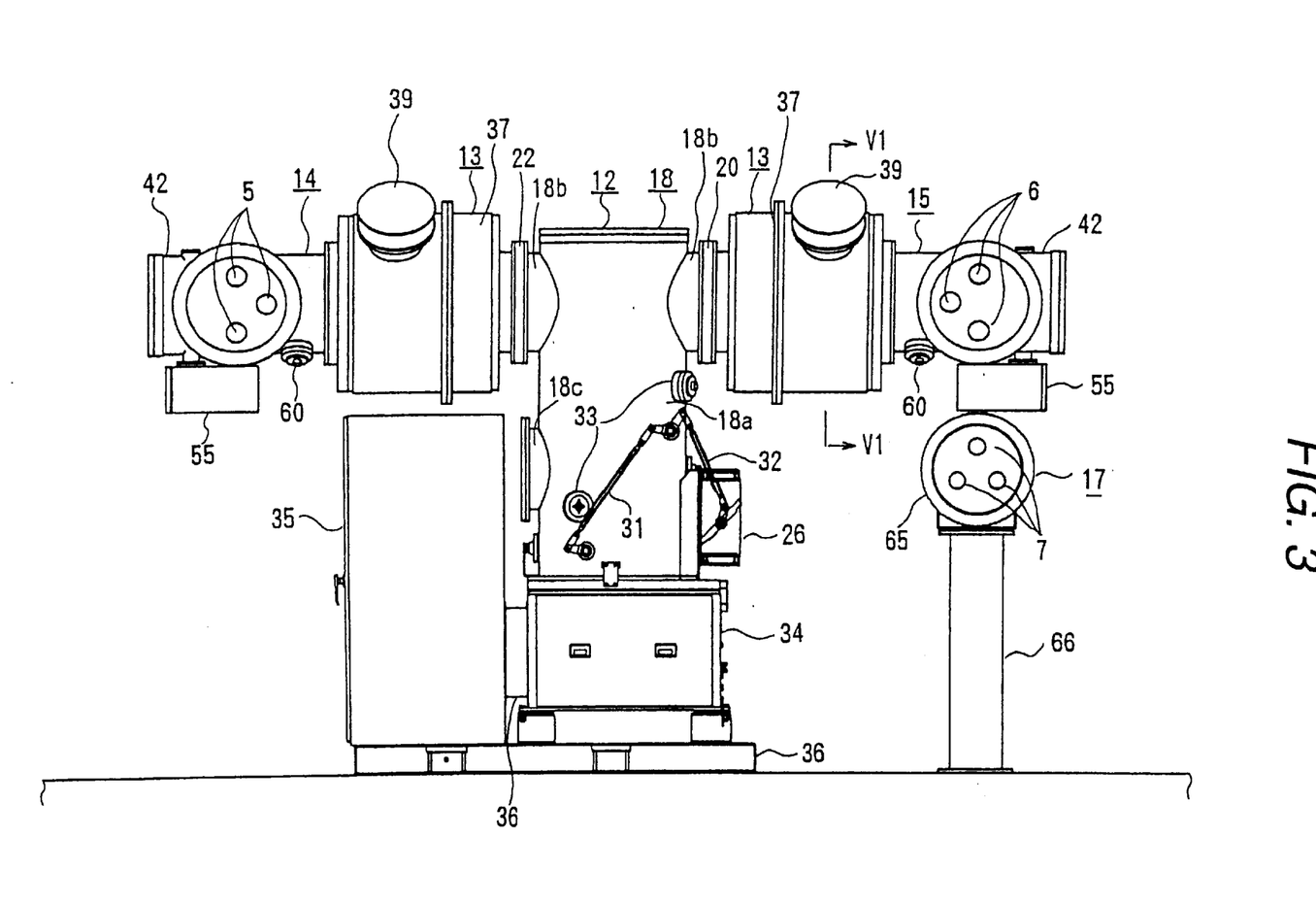
FIG. 3 is a plane view showing a construction of a III direction (a side) of FIG. 1.

FIGS. 1 to 3 show an external construction of the ring bus arrangement type gas insulated switchgear of the embodiment of the present invention, which construction is a real construction of apparatus employing the circuit of FIG. 15. In the present embodiment, the rectangular wave-shaped circuit construction as shown in FIG. 15 is employed as it is in the real apparatus construction. The gas insulated switchgear of the present embodiment employs a three phase common system to reduce its installation area, and reduce the size of the apparatus.

The circuit breaker 1 and the earth devices 2 in FIG. 15 correspond to a circuit breaker unit 12 in FIG. 1, and the current transformer 3 in FIG. 15 corresponds to a current transformer unit 13 in FIG. 1. The disconnecting switches 4, first connection bus 5 and earth device 8 in FIG. 15 correspond to a first connection bus unit 14 in FIG. 1, and the disconnecting switches 4, second connection bus 6 and earth device 8 in FIG. 15 correspond to a second connection bus unit 15 in FIG. 1. The disconnecting switch 9, earth device 10 and cable head 11 in FIG. 15 correspond to a line side unit 16 in FIG. 1, and the return bus 7 in FIG. 15 corresponds to a return bus unit 17 of FIG. 1.

In the present embodiment, a plurality of compound units, each of which is composed of the circuit breaker unit 12 and the current transformer units 13 connected to the circuit breaker unit 12 on the both sides thereof, are arranged perpendicularly to a direction of their connection (in an extension direction of the first connection bus unit 14 and the second connection bus unit 15 on the drawing), that is, they are arranged in one row. A plurality of the first connection bus units 14 are arranged on one side of the arrangement (right on the drawing), a plurality of the second connection units 15 are arranged on the other side (on the left on the drawing), and the plurality of compound units are arranged in series by using alternately the first connection bus units 14 and the second connection bus units 15.

That is, ends of adjacent compound units are connected alternately left and right with respect to the arrangement direction of the compound units by the first connection bus units 14 and the second connection bus units 15 so that a first compound unit and a second compound unit are connected to each other by the first connection bus unit 14, next, the second compound unit and a third compound unit are connected to each other by the second connection bus unit 15, then the third compound unit and a fourth compound unit are connected by the first connection bus unit 14, and so on, that is, they are formed in a rectangular wave shape so as to be the same as the circuit construction in FIG. 15.

The compound units, which are positioned at both ends in the arrangement direction of the compound units, are connected by the return bus unit 17. The line side units 16 are connected to the first connection bus unit 14 and the second connection bus unit 15. The circuit breaker unit 12, current transformer units 13, first connection bus unit 14, second connection bus unit 15 and line side units 16 are connected on a horizontal plane which is the same height as a T-branch portion of the circuit breaker unit 12, described later. The return bus unit 17 is arranged below the second connection bus units 15.

Further, the gas insulated switchgear of the present embodiment also is a compound construction of a first unitary unit (one bay or one circuit line unit) which is composed of the circuit breaker unit 12, the current transformer units 13, the first connection bus unit 14 and the line side unit 16, and a second unitary unit which is composed of the circuit breaker unit 12, the current transformer units 13, the second connection bus unit 15 and the line side unit 16.

Figure 4:
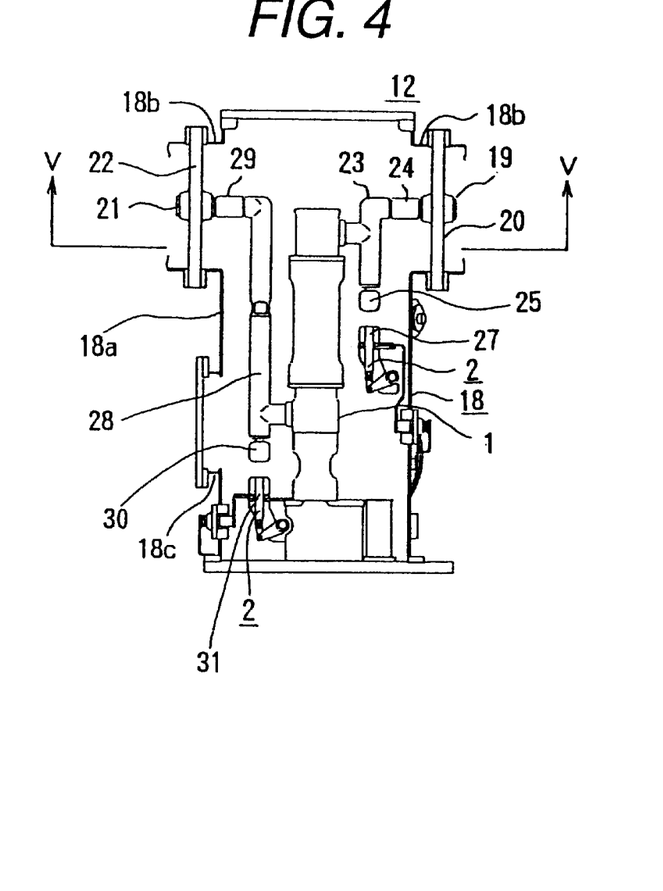
FIG. 4 is a sectional view of an internal construction of a circuit breaker unit of FIG. 3.
Figure 5:
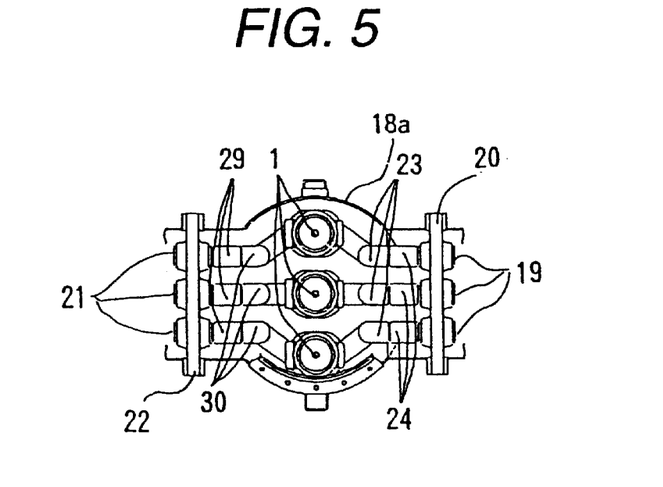
FIG. 5 is a sectional view viewed in arrows V—V of FIG. 4.

FIGS. 4 and 5 show an internal construction of the circuit breaker unit 12. In FIGS. 4 and 5, 18 denotes a enclosure which is composed of a cylindrical vertical enclosure 18a extending perpendicularly, cylindrical horizontal enclosures 18b each branched horizontally (T-branch) in opposite directions from the upper portion of the vertical enclosure 18a, and a cylindrical horizontal enclosure 18c branched horizontally in one direction from a lower portion of the vertical enclosure 18a. The enclosure 18 is grounded and has an insulation gas such as sulphur hexafluoride ($SF_6$) hermetically enclosed therein.

The circuit breakers 1 for three phases are arranged in a straight line at an inside center of the enclosure 18. An insulation spacer 20, in which a conductor connection portion 19 arranged horizontally and in a straight line is embedded, is provided on a flange portion of one of the horizontal enclosures 18b. An insulation spacer 22, in which a conductor connection portion 21 arranged horizontally and in a straight line is embedded, is provided on a flange portion of the other horizontal enclosure 18b. A connection conductor 23 connected to the circuit breaker 1 on the upper end side (on a fixing side of circuit breaker portion) is connected to the conductor connection portion 19 through a contact 24. The connection conductor 23 branches midway to provide a branch, and the branch is provided, at its end, with a fixed electrode 25 of the earth device 2 on the side of the second connection bus 6. The fixed electrode 25 forms an opening and closing portion in cooperation with a movable electrode 27 reciprocating by an operation device 26 of the earth device 2 provided outside the enclosure 18.

A go-and-return conductor 28 which is connected to the lower end side of the circuit breaker 1 (a movable side of the circuit breaker portion) and extends in a vertical direction is connected to the conductor connection portion 21 through a contact 29. The go-and return conductor 28 branches at a lower portion thereof, and an end of a branched portion is provided with a fixed electrode 30 of the earth device 2 on the side of the first connection bus 5. The fixed electrode 30 forms an opening and closing portion of the earth device 2 in cooperation with a movable electrode 31 reciprocating by an operation device 26 of the earth device provided outside the enclosure 18.

The earth devices 2 connected to both sides of the circuit breaker 1 are driven by one operation device 26. Therefore, the operation device 26 is provided with link mechanisms 31, 32 for transmitting driving force to the earth devices 2. The horizontal enclosure 18c is an opening for work which is used when the circuit breaker unit 12 is assembled inside. Further, the enclosure 18 is provided with a plurality of peeping windows 33 through which connecting works of internal conductors and centering works can be watched.

An operation device box 34 containing therein the operation device of the circuit breaker 1 is provided under the enclosure 18. A control box 35 (cubicle) containing therein a control device is arranged on the first connection bus unit 14 side of the enclosure 18. A connection pipe 36 which contains therein wires for transmitting signals from the control device to the operation device is connected between the operation device box 34 and the control box 35. The operation device box 34 and the control box 35 are mounted on a base 36.

Figure 6:
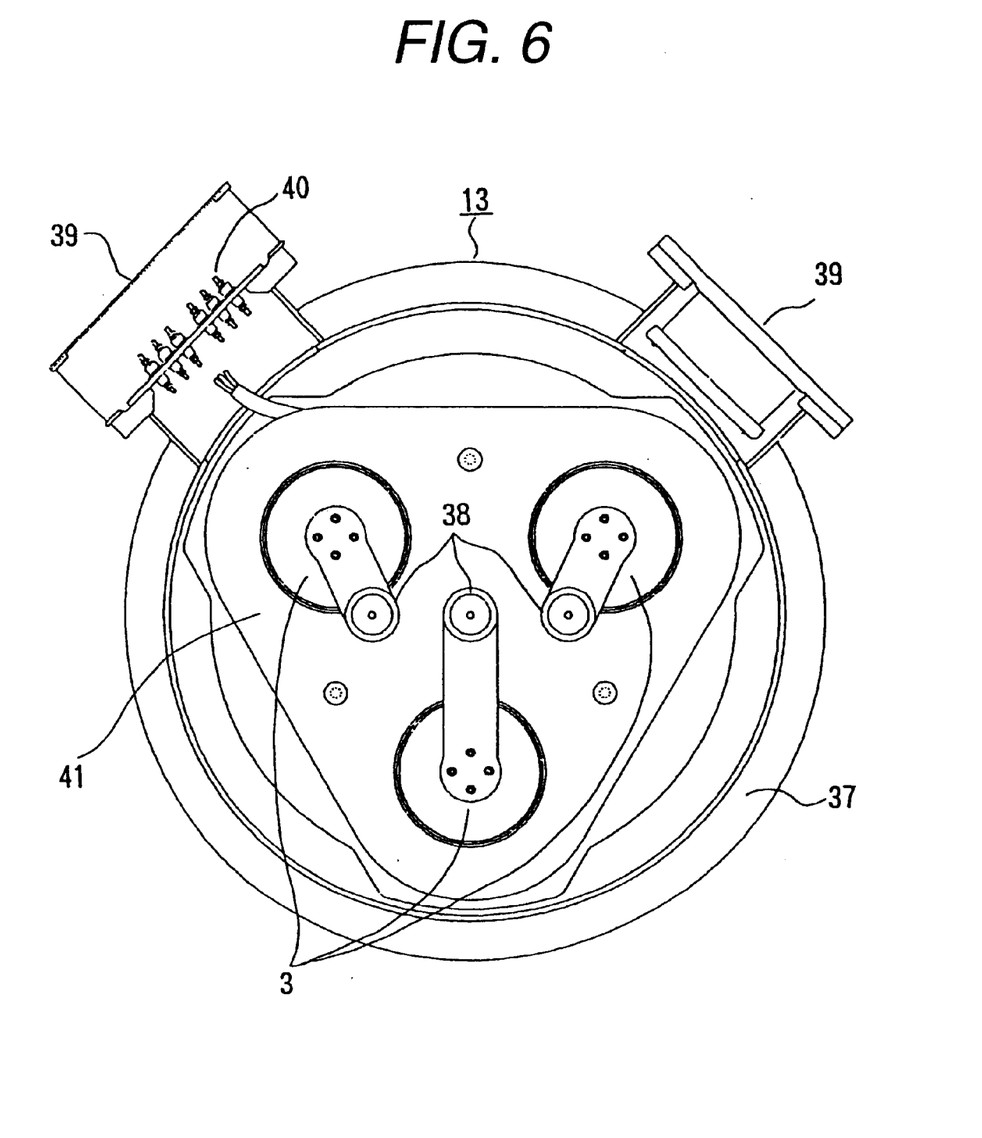
FIG. 6 is a sectional view viewed in arrows VI—VI of FIG. 3, and showing an internal construction of a current transformer unit.
Figure 7:
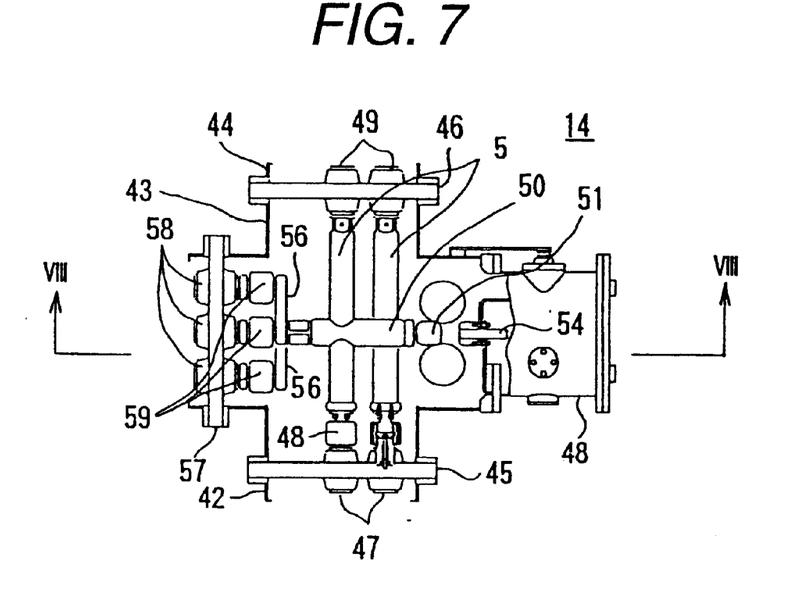
FIG. 7 is a sectional view showing an internal construction of a connection bus in FIG. 3.
Figure 8:
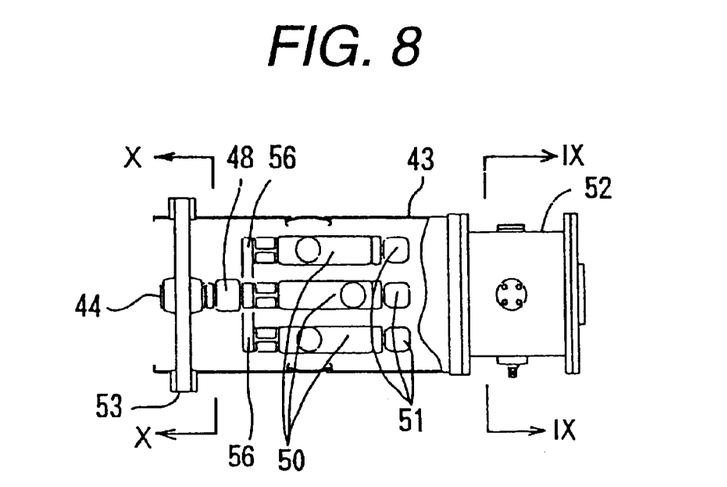
FIG. 8 is a sectional view viewed in arrows VIII—VIII of FIG. 7.
Figure 9:
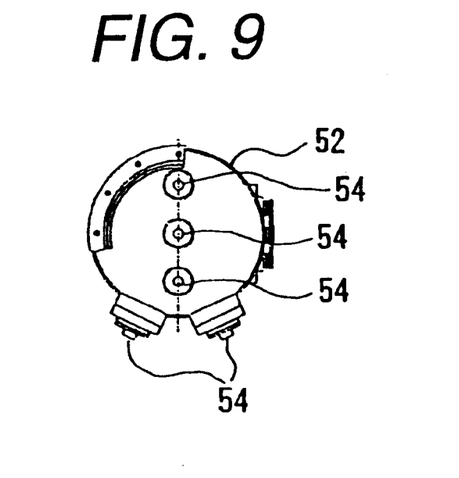
FIG. 9 is a sectional view viewed in arrows IX—IX of FIG. 8.
Figure 10:
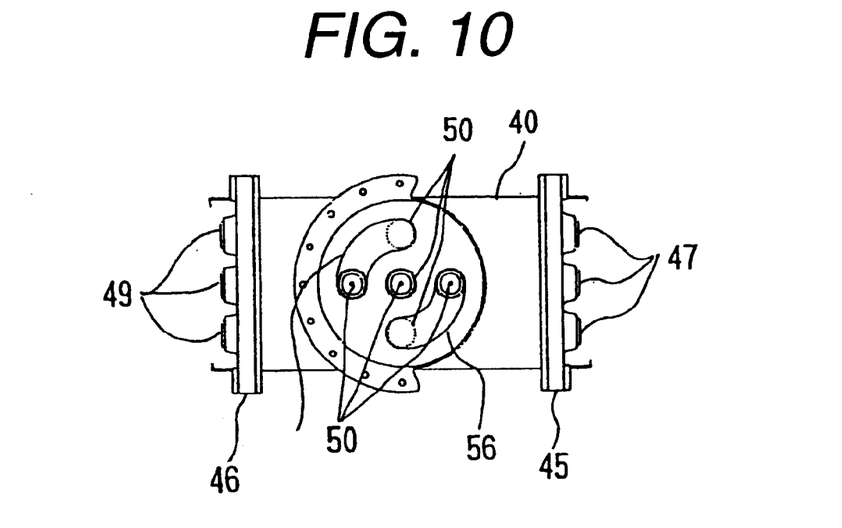
FIG. 10 is a sectional view viewed in arrows X—X of FIG. 8.

FIG. 6 shows an internal construction of the current transformer unit 13. In FIG. 6, 37 denotes a cylindrical enclosure containing therein the current transformers 3 for three phases. The enclosure 37 is grounded and hermetically contains therein an insulation gas such as sulphur hexafluoride ($SF_6$). The current transformers 3 are provided so as to cover outer peripheral sides of conductors 38 which are contained in the enclosure 37 and connected to the conductor connection portions 19, 21 of the insulation spacers 20, 22. Further, when the conductors 38 are arranged in a straight line in a horizontal direction, the enclosure 37 is necessary to be made large in size, so that the conductors 38 are arranged in a triangular shape inside the enclosure 37.

The current transformers 3 each are supported by an inverted triangular shape support 41 arranged inside the enclosure 37. Terminal boxes 39 are provided at two upper positions of the outside of the enclosure 37. Forty secondary terminals of the current transformers 3 are contained in the terminal boxes 39 in the present embodiment. The enclosure 37 has flange portions at both end thereof and the flange portion on the circuit breaker unit 12 side is mechanically connected to the insulation spacer 20, 22.

FIGS. 7 to 10 shows an internal construction of the first connection bus unit 14. Since the first connection bus unit 14 and the second connection bus unit 15 are the same in construction, only the first connection bus unit 14 is explained and explanation of the second connection bus unit 15 is omitted.

The first connection bus unit 14 is formed by connecting cruciform branch enclosures 42, 43, 44 through spacers 45, 46. Each of the cruciform branch enclosures 42, 43, 44 is grounded and hermetically contains therein an insulation gas such as sulphur hexafluoride ($SF_6$). Internal constructions of the cruciform branch enclosures 42, 43, 44 are substantially the same as one another, so that an internal construction of the enclosure 43 connected to the line side unit 16, which is described later, is explained in the present embodiment.

The first connection buses 5 are contained inside the enclosure 43, and one end of each first connection bus 5 is connected to a conductor connecting portion 47 of the insulation spacer 45 through a contact 48 and the other end is connected to a conductor connecting portion 49 of the spacer 46. The first connection buses 5 are arranged in a triangular shape, and the conductor connecting portions 47, 49 also are arranged in a triangular shaped so as to cope-with the first connection buses 5.

Branch buses 50 branch from the first connection buses 5 in a cruciform shape in a direction perpendicular to the extending direction of the first connection buses 5, respectively. At this time, the branch buses 50 each branch perpendicularly in a straight line. Fixed electrodes 51 of the earth devices 8 are provided on one side of the branch buses 50, respectively. The fixed electrodes 51 form opening and closing portions of the earth devices 8 in cooperation with movable electrodes 54 reciprocating by operation devices 53 of the earth devices 8 provided outside the enclosure 43 through a enclosure 52 containing therein the link mechanisms of the earth devices 8. Further, in the case of the enclosures 42, 44, fixed electrodes of the disconnecting switches 4 are provided on one sides of the branch buses 50, and form opening and closing portions of the disconnecting switches 4 in cooperation with movable electrodes rotating by an operation device 55 of the disconnecting switches 4.

The other sides of the branch buses 50 branch perpendicularly in a straight line, and right after the branch, the arrangement is converted by arc-shaped converting conductors 56 so that the branch buses are horizontal and in a straight line. The branch buses positioned at both sides are converted and the branch bus 50 positioned at the center extends in a straight line. The branch buses 50 the arrangement of which is converted are connected to conductor connecting portions 58 of an insulation spacer 57 through a contact 59. The conductor connecting portions 58 are arranged horizontally in a straight line and embedded in the insulation spacer 57. Further, in the case of the enclosures 42, 44, the arrangement of branch buses to which fixed electrodes of the disconnecting switches 4 are connected are converted from a vertical direction to a horizontal direction. 60 denotes peeping windows.

Figure 11:
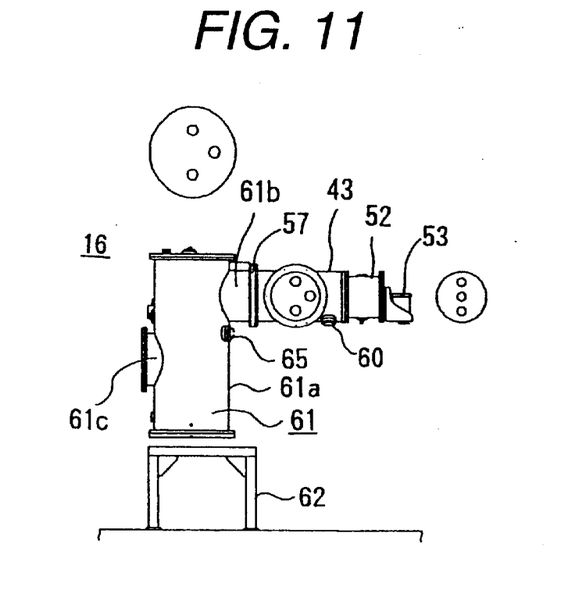
FIG. 11 is a plane view showing an external construction of a line side unit (cubicle side) of FIG. 1.
Figure 12:
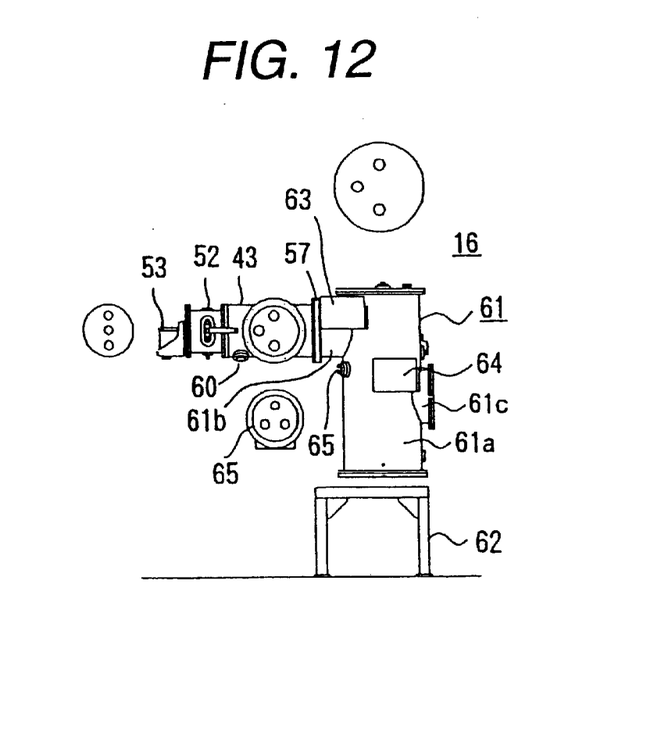
FIG. 12 is a plane view showing an external construction of a line side unit (return bus unit side) of FIG. 1.

FIGS. 11 and 12 show an external construction of the line side unit 16. In FIGS. 11 and 12, 61 denotes a enclosure which is composed of a cylindrical vertical enclosure 61a extending vertically, a cylindrical horizontal enclosure 61b branched horizontally (L-branch) on one side (toward the connection bus unit side) from an upper portion, and a cylindrical horizontal enclosure 61c horizontally branched on the other side (opposite connection bus unit side) from an lower portion of the vertical enclosure 61a. The enclosure 61 is mounted on a mounting frame 62. The enclosure 61 is grounded and hermetically contains therein an insulation gas such as sulphur hexafluoride ($SF_6$).

A flange portion of the horizontal enclosure 61b is mechanically joined the insulation spacer 57. The connection conductors connected to the conductor connecting portions 58 of the insulation spacer 57 are arranged in a triangular shape, and connected to the cable heads 11 (not shown) protruding downward from an lower portion of the enclosure 61. The opening and closing portions of the disconnecting switch 9 and the earth device 10 are provided midway through the connecting conductors. An operation device 63 of the disconnecting switch 9 and an operation device 64 of the earth device 10 are provided on the outside of the enclosure 61. 65 denotes a peeping window.

Further, in the present embodiment, line ends are made into the cable heads 11, however, they can be made into gas insulated bushings. Therefore, in the present embodiment, the horizontal enclosure 61c provided on the lower portion of the vertical enclosure 61a of the enclosure 61 is constructed so as to be able to be connected to a enclosure of the gas insulated bushings. The horizontal enclosure 61c is also used for internal work of the enclosure 61.

Figure 13:
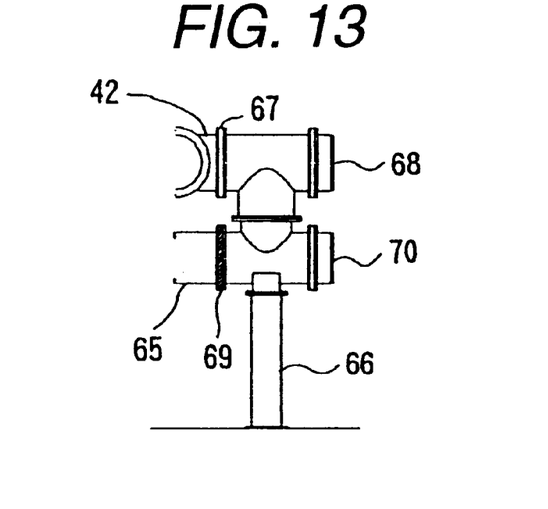
FIG. 13 is a plane view showing a connection construction of a connection bus unit and a return bus unit on the A side of FIG. 1.
Figure 14:
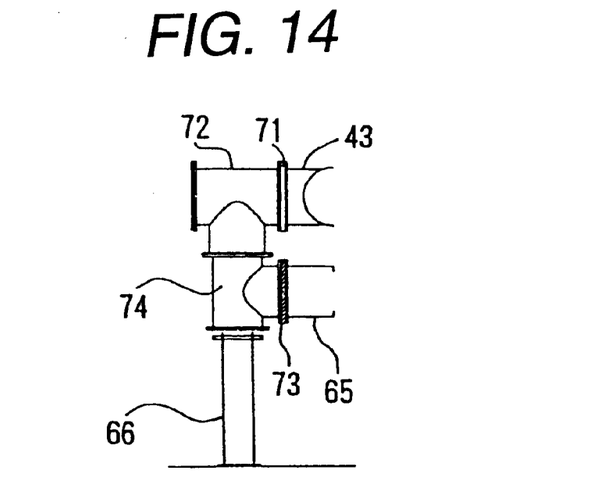
FIG. 14 is a plane view showing a connection construction of a connection bus unit and a return bus unit on the B side of FIG. 1.

FIGS. 13 and 14 show a connection portion of the return bus unit 17 and the second connection bus unit 15. The return bus unit 17 is grounded and the return buses 17 arranged in a triangular shape is contained in a cylindrical enclosure 65 which hermetically contains therein an insulation gas such as sulphur hexafluoride ($SF_6$). The return bus unit 17 is supported at a plurality of places by supports 66.

As shown in FIG. 13, connection between the return bus unit 17 and the second connection bus unit 15 on the A side of FIG. 1 is carried out by connecting between a T-branch enclosure 68 connected to the cruciform branch enclosure 42 of the second connection bus unit 33 through an insulation spacer 67 and a T-branch enclosure 70 connected to the enclosure 65 of the return bus unit 17 through an insulation spacer 69. The T-branch enclosures 68, 70 each are grounded and hermetically contain therein an insulation gas such as sulphur hexafluoride ($SF_6$).

As shown in FIG. 14, connection between the return bus unit 17 and the second connection bus unit 15 on the B side of FIG. 1 is carried out by connecting between a T-branch enclosure 72 connected to the cruciform branch enclosure 43 of the second connection bus unit 33 through an insulation spacer 71 and a T-branch enclosure 74 connected to the enclosure 65 of the return bus unit 17 through an insulation spacer 73. The T-branch enclosures 72, 74 each are grounded and hermetically contain therein an insulation gas such as sulphur hexafluoride ($SF_6$).

According to the present embodiment as explained above, a plurality of compound units, in each of which the circuit beaker unit 12 T-branched is arranged at a center and the current transformer units 13 are arranged on both sides thereof, are arranged perpendicularly to the branch direction of the circuit breaker unit 12, and ends of the adjacent compound units are connected alternately by the first connection units 14 and the second connection units 15 on a horizontal plane of the same height as the T-branch portion of the circuit breaker unit 12 to form a rectangular wave shape, so that the first connection bus 5 and the second connection bus 6 are stretched around on the horizontal plane of the same height as the T-branch portion, not stretched around in the up and down direction, and the length of the connection bus can be made shorter than that in conventional apparatus. Therefore, it is possible to reduce the cost. For example, the length of the connection bus can be reduced by about 20% as compared with that in a conventional apparatus disclosed in JP A 57-211915.

Further, according to the present embodiment, the current transformer units 12, the first connection bus units 14, the second connection bus units 15 and the line side units 16 are connected on a horizontal plane of the same height as the T-branch portions of the circuit breaker units 12, so that it is possible to arrange the control box 35 at a position adjacent to the circuit breaker unit 12 on the first connection bus unit 14 side below the current transformer unit 12, whereby the width size of the gas insulated switchgear (the axial length of the compound unit) can be reduces as compared with conventional apparatus. For example, the width size of the gas insulated switchgear can be reduced by about 15% than that of the conventional apparatus disclosed in JP A 57-211915 and the installation area can be reduced corresponding to the reduced width size.

Further, according to the present embodiment, since the return bus unit 17 is arranged below (preferably right under) the second connection bus units 15, it is possible to reduce the length of bus connecting the second connection bus unit 15 and the return bus unit 17 and to reduce the cost.

Further, according to the present embodiment, since the control box 35 is arranged below the circuit breaker unit 12 on the first connection bus unit 14 side of the current transformer unit 13, it is possible to easily carry out taking out and maintenance inspection of the operation device of the circuit breakers 1 and the operation device 26 of the earth devices 2 by utilizing a space below the current transformer 13 on the second connection bus unit 15 side.

Further, according to the present embodiment, since the rectangular wave-shaped construction as mentioned above is taken, in the case where extension is taken in future, a circuit line can be installed more only by taking off the connection portion of the second connection bus unit 15 and the return bus unit 17, installing more a unitary unit (a unit composed of a compound unit, a connection bus unit and a line side unit) and increasing the return bus unit 17 and the extension can be easily carried out. The taken-off connection portion of the second connection bus unit 15 and the return bus unit 17 can be used again as it is, so that it is possible to reduce the cost thereby. For example, in the conventional apparatus disclosed in JP A 57-211915, particularly, when the circuit line number is odd, a position of leading-out of the connection bus connected to the return bus changes, so that it become necessary to produce newly a new unit.

Further, according to the present embodiment, the circuit construction by a single connection line and the real apparatus construction are constructed and arranged the same as each other, that is, along the skeleton of the units. By taking such a construction, even if an accident occurred, the accident portion can be easily found, so that it is possible to restore the portion of the accident soon. Therefore, the reliability can be increased. Further, in the case of maintenance inspection, since inspection portions can be easily found, it is possible to increase the workability of the maintenance inspection. Further, the circuit construction by a single connection line is applied on an operation panel of a monitoring room as a simulation bus, operation switches of each apparatus are mounted on the simulation bus, and when the circuit construction by a single connection line and the real apparatus construction are the same as each other, it is possible to prevent erroneous operation by operators.

Further, in the present embodiment, the current transfers 3 are not integrated into the circuit breaker unit 12, but provided separately as the current transformer units 13, and connected to the both sides of the circuit breaker unit 12, so that precise current detection is carried out without being affected by current interruption arcs of the circuit beakers 1 and sure interruption operation can be conducted. Therefore, the reliability can be increased. Further, since the current transformers 3 are not incorporated into the circuit breaker 12, it is possible to reduce the height size of the circuit breaker unit 12.

Further, since the current transformers 3 are not incorporated into the circuit breaker unit 12, even if an accident occurs on the reverse circuit breaker 1 side of the current transformer 3, a current supply failure region can be limited to only the accident circuit line without interrupting the circuit breakers 1 of all the circuit lines. For example, in the case where the current transformers 3 are incorporated into the circuit breaker unit 12, if an accident occurs on the reverse circuit breaker 1 side of the current transformer 3, the control device interrupts the circuit breakers 1 of all the circuit lines as an accident of the circuit breaker unit 12 and all the circuit lines are brought into power supply failure, so that it results in being lowered in service of power supply.

Industrial Applicability

The present invention is suitable for a ring bus arrangement type gas insulated switchgear which is intended to shorten connection buses. Further, it is also suitable for a ring bus arrangement type gas insulated switchgear which is intended to raise the workability of maintenance inspection.

What is claimed is:

1. A gas-insulated switchgear comprising:
   a circuit breaker unit in which an operation direction of each circuit breaker is vertical, said circuit breaker unit being connected with other circuit breaker units at an upper portion thereof;
   current transformer units connected to both sides of said circuit breaker units, respectively;
   connection bus units connected to said current transformer units, and said connection bus units connecting, alternately on the left and on the right of an arrangement direction of said circuit breaker units, adjacent circuit breaker units on a horizontal plane of approximately the same height as the connection portions of said circuit breaker unit to said other circuit breaker units; and
   return bus units connecting between circuit breaker units positioned at both ends in the arrangement direction of said circuit breaker units.

2. A gas-insulated switchgear according to claim 1, wherein each said circuit breaker unit comprises a circuit breaker of three phases, and
   said current transformer units each has current transformers for three phases.

3. A gas-insulated switchgear according to claim 2, wherein said current transformer units each have buses arranged in a triangular shape and connected to said circuit breaker units.

* * * * *